United States Patent
Edney

(10) Patent No.: US 10,708,504 B2
(45) Date of Patent: Jul. 7, 2020

(54) VEHICLE CAMERA SYSTEM

(71) Applicant: Jaguar Land Rover Limited, Coventry (GB)

(72) Inventor: Martin Edney, Coventry (GB)

(73) Assignee: JAGUAR LAND ROVER LIMITED, Coventry, Warwickshi (GB)

( * ) Notice: Subject to any disclaimer, the term of this patent is extended or adjusted under 35 U.S.C. 154(b) by 38 days.

(21) Appl. No.: 15/320,900

(22) PCT Filed: Jul. 8, 2015

(86) PCT No.: PCT/EP2015/065613
§ 371 (c)(1),
(2) Date: Dec. 21, 2016

(87) PCT Pub. No.: WO2016/005453
PCT Pub. Date: Jan. 14, 2016

(65) Prior Publication Data
US 2017/0201687 A1    Jul. 13, 2017

(30) Foreign Application Priority Data
Jul. 9, 2014   (GB) .................................. 1412232.9

(51) Int. Cl.
*H04N 5/232* (2006.01)
*B60R 1/00* (2006.01)
(Continued)

(52) U.S. Cl.
CPC ........... *H04N 5/23293* (2013.01); *B60R 1/00* (2013.01); *G06K 9/00805* (2013.01);
(Continued)

(58) Field of Classification Search
CPC ........... H04N 5/23293; G06K 9/00805; G06K 9/6202; B60K 2350/106; B60K 2350/2013; B60K 2350/253
(Continued)

(56) References Cited

U.S. PATENT DOCUMENTS

| | | | |
|---|---|---|---|
| 2002/0044048 A1* | 4/2002 | Watanabe | G01S 13/87 340/436 |
| 2009/0073081 A1* | 3/2009 | Kakizaki | G02B 27/01 345/7 |

(Continued)

FOREIGN PATENT DOCUMENTS

| | | |
|---|---|---|
| JP | 2001-039248 A | 2/2001 |
| JP | 2002-109696 A | 4/2002 |

(Continued)

OTHER PUBLICATIONS

Combined Search and Examination Report, GB Application No. 1412232.9, dated Jan. 9, 2015, 7 pages.
(Continued)

*Primary Examiner* — Farzana Hossain
(74) *Attorney, Agent, or Firm* — Miller Nash Graham & Dunn LLP

(57) ABSTRACT

A vehicle camera system comprising: a camera arranged to capture image data from a field of view surrounding a host vehicle; a display arranged to display the image data; and a processor arranged to: determine the presence of obstructions in the field of view; and control the display to display the image data in dependence on the detection of obstructions in the field of view.

17 Claims, 7 Drawing Sheets

(51) Int. Cl.
 *G06K 9/00* (2006.01)
 *G06K 9/62* (2006.01)
 *H04N 7/18* (2006.01)

(52) U.S. Cl.
 CPC ....... *G06K 9/6202* (2013.01); *H04N 5/23238* (2013.01); *H04N 7/181* (2013.01); *B60K 2370/152* (2019.05); *B60K 2370/21* (2019.05); *B60K 2370/52* (2019.05); *B60R 2300/105* (2013.01); *B60R 2300/301* (2013.01); *B60R 2300/302* (2013.01); *B60R 2300/70* (2013.01); *B60R 2300/802* (2013.01); *B60R 2300/8093* (2013.01)

(58) Field of Classification Search
 USPC ........................................................ 348/148
 See application file for complete search history.

(56) References Cited

U.S. PATENT DOCUMENTS

| | | | | |
|---|---|---|---|---|
| 2010/0097457 | A1* | 4/2010 | Zhang | G06K 9/00798 348/119 |
| 2011/0032357 | A1* | 2/2011 | Kitaura | B60R 1/00 348/148 |
| 2012/0062743 | A1* | 3/2012 | Lynam | B60Q 9/005 348/148 |
| 2013/0093887 | A1* | 4/2013 | Wu | G06K 9/00805 348/148 |
| 2014/0347485 | A1* | 11/2014 | Zhang | B60R 11/04 348/148 |
| 2015/0274074 | A1* | 10/2015 | Petrillo | B60R 1/00 701/36 |

FOREIGN PATENT DOCUMENTS

| | | |
|---|---|---|
| JP | 2005-123967 A | 5/2005 |
| JP | 2005-199892 A | 7/2005 |
| JP | 2008-306402 A | 12/2008 |

OTHER PUBLICATIONS

Combined Search and Examination Report, GB Application No. 1511941.5, dated Dec. 31, 2015, 6 pages.

Notification of Transmittal of the International Search Report and the Written Opinion of the International Searching Authority, or the Declaration, PCT/EP2015/065613, dated Oct. 6, 2015, 10 pages.

* cited by examiner

VEHICLE CAMERA SYSTEM

RELATED APPLICATIONS

This application is a 35 U.S.C. § 371 national stage application of PCT Application No. PCT/EP2015/065613, filed on Jul. 8, 2015, which claims priority from Great Britain Patent Application No. 1412232.9 filed on Jul. 9, 2014, the contents of which are incorporated herein by reference in their entireties. The above-referenced PCT International Application was published in the English language as International Publication No. WO 2016/005453 A1 on Jan. 14, 2016.

TECHNICAL FIELD

The present invention relates to a vehicle camera system. Aspects of the invention relate to a vehicle camera system, a camera system for a vehicle, a method and a vehicle.

BACKGROUND

Road vehicle drivers often encounter driving scenarios where their view is obstructed by, for example, neighbouring vehicles, hedges, etc. Camera systems have been employed to aid the driver. The systems consist of cameras that obtain images for presentation inside the vehicle when the driver expresses a wish to see those images by pressing a switch inside the vehicle. The cameras are positioned at the front end of the vehicle and directed outwards in left and right directions. Images obtained by the cameras are presented to the driver via a conventional screen in the dashboard when the driver presses the switch. The camera system is thus able to provide the driver with a view relatively forward of their eye position.

The driver may use information provided by the camera system to aid them in obstructed situations. For example, the driver might press the switch to engage the camera system when exiting a car parking space where cars are parked beside the driver. The driver can then use the presented images to inform their decision of whether it is safe or not to begin to move out of the space before directly checking that it is safe to completely move out of the space. Similarly, the driver might press the switch to engage the camera system when encountering a road junction, for example a T-junction. The driver can use the presented images to inform their decision of whether it is safe or not to begin to move out of or onto the junction before directly checking that it is safe to proceed.

The requirement on the driver to engage the camera system by pressing a switch represents a burden to the driver, which sometimes leads to drivers forgetting to utilise the camera system or forgetting to turn the camera system off. Aspects of the invention seek to mitigate the burden on the driver.

SUMMARY OF INVENTION

According to an aspect of the invention, there is provided a vehicle camera system comprising:
a camera arranged to capture image data from a field of view surrounding a host vehicle;
a display arranged to display the image data; and
a processor arranged to:
determine the presence of obstructions in the field of view; and
control the display to display the image data in dependence on the detection of obstructions in the field of view.

The system is particularly advantageous in that it automates the use of camera systems on the vehicle to enable the driver to see past obstructions in their view.

Optionally, the processor is arranged to:
determine the speed of movement of the host vehicle; and
control the display to display the image data when the speed of the host vehicle is below a predetermined threshold.

The processor may be arranged to:
determine the speed of movement of the host vehicle; and
prevent the display of image data when the speed of the host vehicle is above a predetermined threshold.

In one embodiment, the processor is arranged to:
determine the location of the host vehicle; and
control the display to display the image data when the host vehicle is at a predetermined location.

Alternatively, the processor is arranged to:
determine the location of the host vehicle; and
prevent the display of image data when the host vehicle is at a predetermined location.

Optionally, the processor is arranged to:
determine the mode of the host vehicle; and
control the display to display the image data in dependence on the mode of the host vehicle.

In one embodiment, the processor determines the presence of obstructions in the field of view using an object detection algorithm wherein the field of view is referenced against a known reference and determination of the presence of obstructions in the field of view is made in dependence on differences found in the comparison.

The expected field of view may comprise a substantially empty three dimensional space having an expected depth.

In one embodiment, the camera is positionable at the front of the host vehicle and the field of view encompasses a view perpendicular to a forward facing of the host vehicle.

In another embodiment, the camera is positionable at the rear of the host vehicle and the field of view encompasses a view perpendicular to a rearward facing of the host vehicle.

Optionally, a further camera is arranged to capture further image data from a further field of view surrounding the host vehicle, wherein the display is arranged to display the further image data and the processor is arranged to:
determine the presence of obstructions in the further field of view;
control the display to display the further image data in dependence on the detection of obstructions in the field of view,
wherein the processor is arranged to:
determine a direction heading of the host vehicle; and
control the display to display one of the image data or the further image data in dependence on the direction heading.

Optionally, the vehicle camera system comprises a wide angle lens wherein the field of view is equal to or greater than 180°.

In one embodiment, the vehicle camera system comprises an override switch operable to control the display to display or not display the image data.

According to another aspect of the invention, there is provided a method for selectively displaying information to a driver of a host vehicle, the method comprising:
capturing image data from a field of view surrounding the host vehicle;

determining the presence of obstructions in the field of view; and displaying the image data in dependence on the detection of obstructions in the field of view.

The method may comprise:

determining the speed of movement of the host vehicle; and controlling the display to display the image data when the speed of the host vehicle is below a predetermined threshold.

Optionally, the method comprises:

determining the location of the host vehicle; and controlling the display to display the image data when the host vehicle is at a predetermined location.

Alternatively, the method comprises:

determining the location of the host vehicle; and preventing the display of image data when the host vehicle is at a predetermined location.

In another embodiment, the method comprises:

determining the mode of the host vehicle; and controlling the display to display the image data in dependence on the mode of the host vehicle.

According to another aspect of the invention, there is provided a vehicle camera system arranged to perform the method of the foregoing aspect.

According to yet another aspect of the invention, there is provided a host vehicle comprising a vehicle camera system according to a foregoing aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
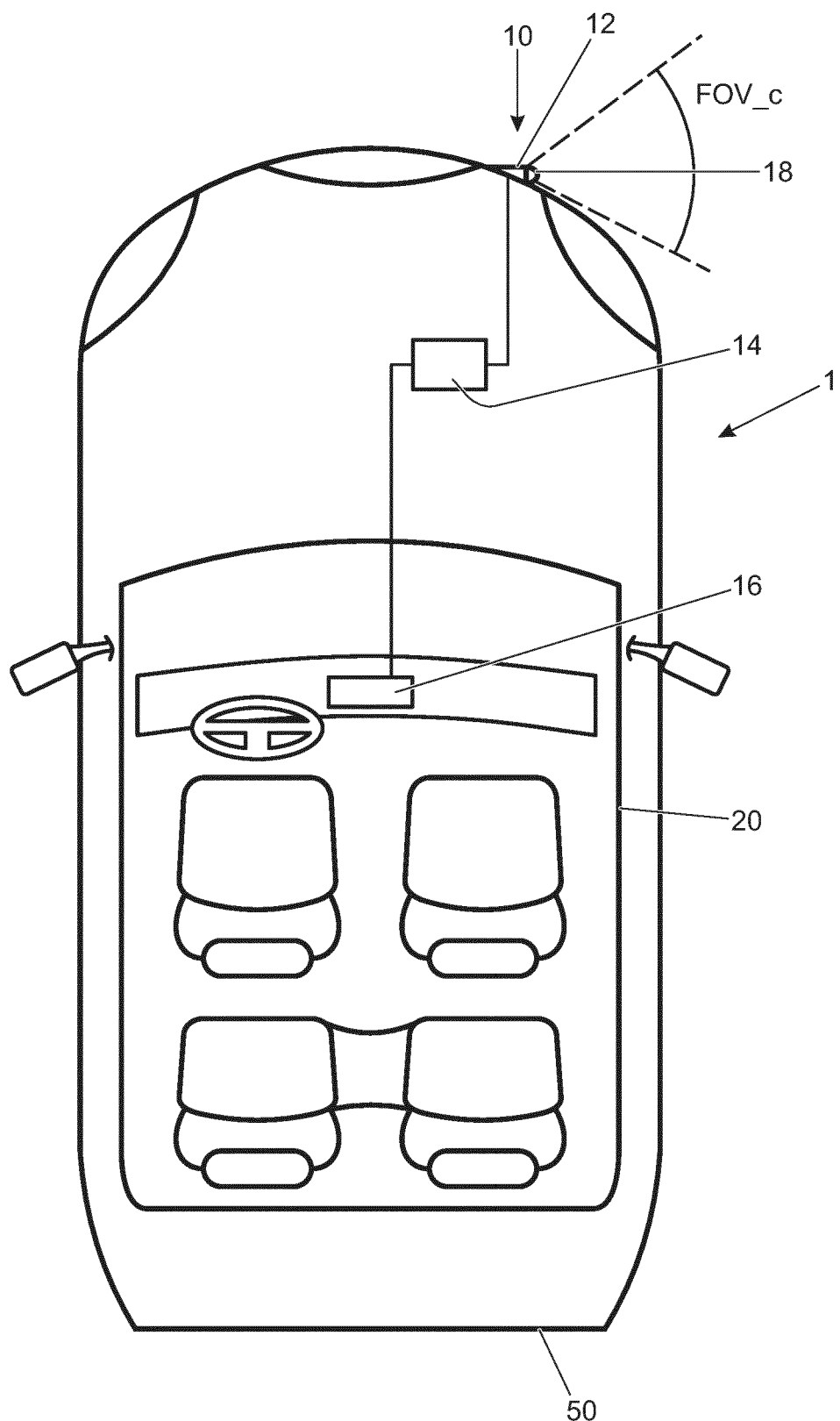
FIG. 1 schematically shows a vehicle and vehicle camera system according to an embodiment of the invention.

A vehicle 1 having a vehicle camera system 10 according to an embodiment of the present invention is shown in FIG. 1. The vehicle camera system 10 comprises a camera 12, a processor 14 and a display 16. The camera 12 is positioned at the front of the vehicle and has a lens 18 to provide a field of view FOV_c that includes a view perpendicular to the forward direction of facing of the vehicle. The camera has a field of view which includes a view similar to that observed by a driver 2 of the vehicle 1 when looking to their left or right, for example, out of the side windows 20 of the vehicle. Two cameras may be used each to provide one of the left or right views. Alternatively one camera may have a field of view that encompasses both the left and right views as described further below.

The camera 12 captures image data, which is passed to the processor 14, which processes the image data to determine the presence of an obstruction in the field of view FOV_c. In some embodiments of the invention, the processor controls the display to display the image data when an obstruction is detected. The displayed image data can be used by the driver to aid their vision past the obstruction or occlusion in their field of view.

Figure 2:
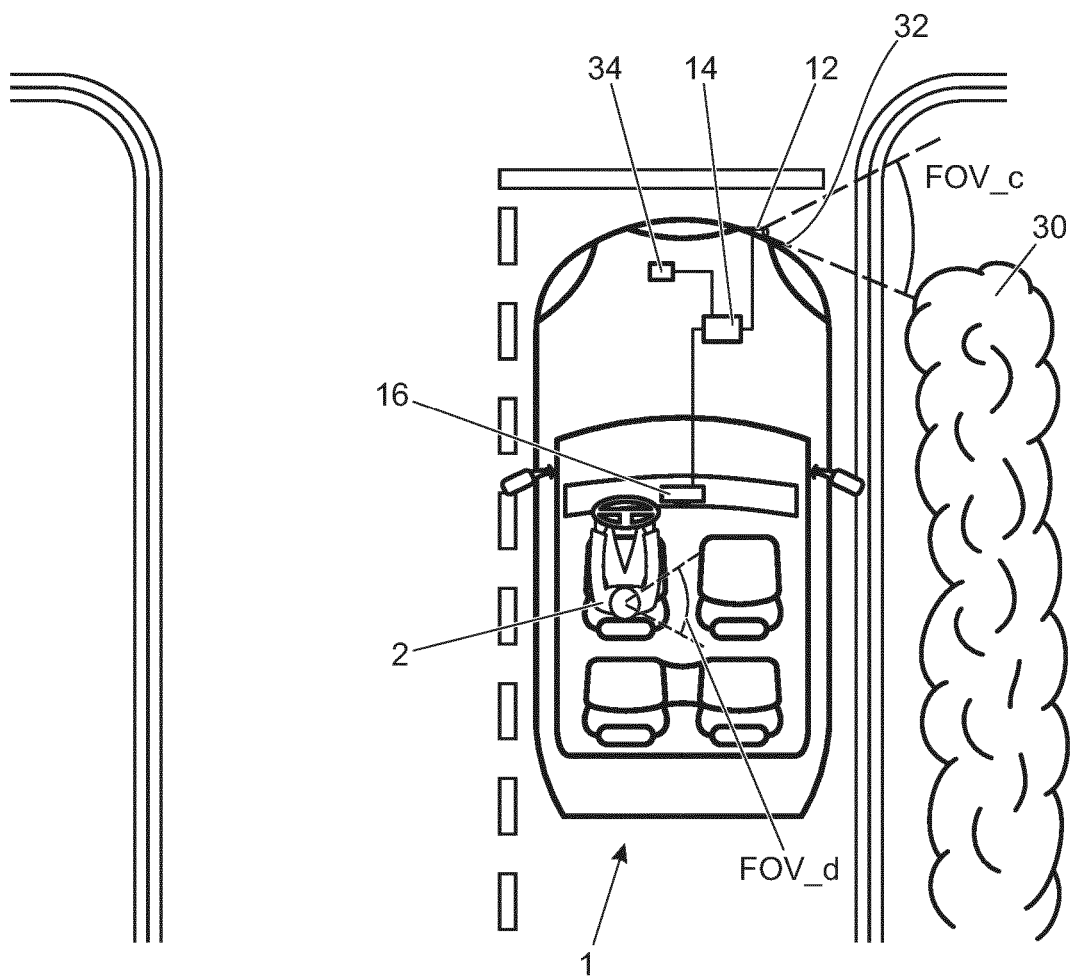
FIG. 2 schematically shows the vehicle of FIG. 1 at a T-junction scenario.
Figure 3:
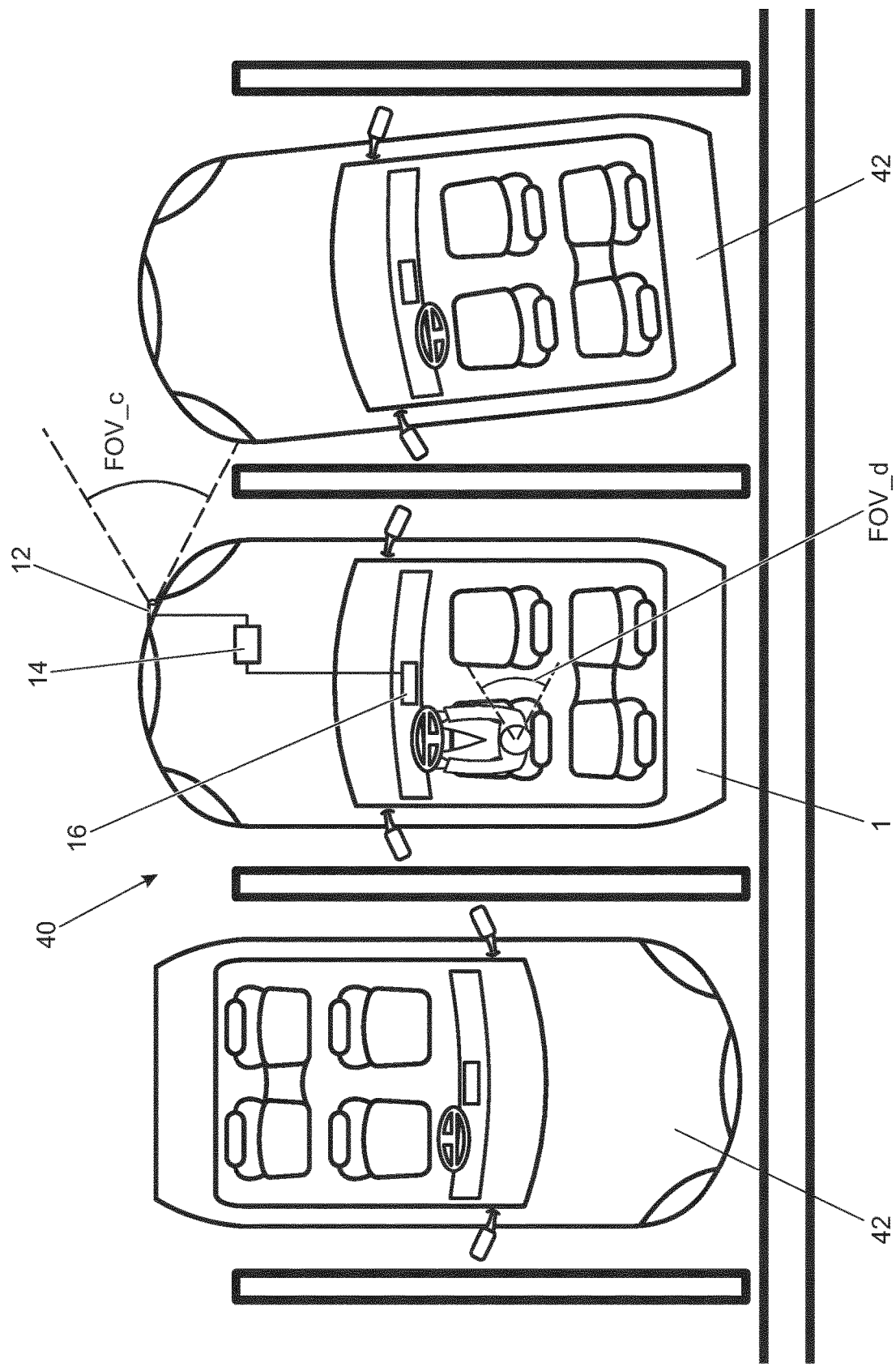
FIG. 3 schematically shows the vehicle of FIG. 1 in a car parking space.

Example scenarios where the camera system may be used by the driver include exiting a junction, as schematically shown in FIG. 2, and exiting a car parking space, as schematically shown in FIG. 3. In these scenarios there are often obstructions to the driver's view caused by objects such as hedges, trees, other cars, and the like. The driver of a vehicle not equipped with a camera system according to embodiments of the present invention, has to, in these scenarios, cautiously move the vehicle forward to see past obstructions in their view before determining whether it is safe to proceed further. Where the driver is aided by a camera system according to embodiments of the present invention, the driver is able to use the images displayed on the display 16 to determine whether they may begin to move their vehicle so as to see directly past the obstruction.

FIG. 2 shows a schematic situation where the driver 2 is at a T-junction where a hedge 30 obscures the driver's view to the right hand side of the car. The camera 12 captures image data from the field of view FOV_c. The image data is passed to the processor 14, which processes the image data to determine the presence of the hedge 30 in the field of view FOV_c. The processor processes the image data using an object detection algorithm wherein the field of view is compared to an expected field of view and determination of the presence of the hedge in the field of view FOV_c is made in dependence on differences found in the comparison. This operation may also be termed as referencing the field of view against a known reference view.

The expected, or reference, field of view is an empty space of a predefined depth, for example, 10 m. As schematically shown in FIG. 2, the captured image data reveals the hedge 30 in the image data at, for example, 1.5 m from the camera 12. Comparison of the expected field of view with the captured image data thus indicates the presence of an object, namely the hedge 30, at 1.5 m from the vehicle. On determining the presence of the object in the field of view, the processor 14 controls the display 16 to display the image data.

In embodiments according to the invention, the processor 14 controls the display 16 to only display the image data when the object is determined to be in the driver's view required to exit the junction. For this, the position of the object 30 in the image data is calculated using a known reference point in the image data. For example, where the field of view FOV_c encompasses a front portion 32 of the vehicle 1, the front portion forms a known point in the image data. In other arrangements, the field of view is known by calibration of the field of view of the camera 12 so that the position of an object in the field can be directly determined without reference to the position of a known reference point. If the position of the object is such that the detected object lies in a line of site of the driver, the object is determined to be an obstruction in the driver's view. With reference to FIG. 2, the hedge is shown to be present in the rearward, that which is closest to the driver, part of the field of view FOV_c. The hedge is thus determined to obstruct the driver's view and so the processor 14 controls the display 16 to display the image data.

In some embodiments of the invention, the camera 12 captures a series of images, each at timed intervals, on approach to a junction. The processor is configured to process each image in the series and determine whether or not an object is present in each image.

In some embodiments according to the invention, the system comprises a vehicle speed sensor arranged to provide vehicle speed data to the processor. In some example embodiments, the vehicle speed sensor is the sensor present as standard in vehicles to indicate the speed to the driver. In other embodiments, the vehicle speed sensor is separate to the standard vehicle speed sensor. In an example, the vehicle speed data is used by the processor to determine whether the vehicle is approaching a junction. Approach to a junction typically involves braking and therefore deceleration of the vehicle. The processor distinguishes junction approach from, for example, braking for cornering by comparing the vehicle speed to an approach speed threshold. In an example embodiment, the approach speed threshold is set at 5 mph (8 kph). However, other speeds in the range 0 to 10 mph may be used.

In embodiments where the processor has input from a vehicle speed sensor, a position of each captured image can be determined with respect to the current position of the vehicle using distance=speed×time. The processor is provided with a measurement of the distance between the camera 12 and the approximate position of the driver's head such that it may determine images in the series relevant to the driver. This is particularly useful, for example, where the driver drives up to a junction that is flanked by a hedge which, at the junction is not in the field of view of the camera 12 but is in the field of view of the driver.

In an example embodiment, on determining that the vehicle speed has decreased below the approach speed threshold, the processor configures the camera to begin to capture the series of images described above. In another example embodiment, on determining that the vehicle speed has decreased below the approach speed threshold, the processor configures display to display the images captured by the camera. It is to be appreciated that in some embodiments, the determination of the vehicle speed decreasing below the approach speed threshold initiates the capturing of the series of images and permits the display of images. Thus, if the speed increases above the threshold, the processor configures the display to not display the images captured.

In an example embodiment, the system comprises a forward looking camera situated in the windscreen or otherwise. On approach to a junction, as indicated by slowing the vehicle, the forward looking camera looks for horizontal lines showing that a junction is ahead. In some embodiments a speed threshold is used to begin the search. In other example embodiments, data from a navigation system is used to pre-calculate the approximate location of junctions and activate the forward looking camera when the distance to the approximate location falls below a predetermined threshold. This may be, for example, 60 m. Other distances are also usable.

In an example embodiment, the system monitors the vehicle speed so that when the speed reduces below a threshold speed, for example 10 kph, 6 mph, the system uses ultrasonic sensors, radar sensors and surround cameras to detect obstructions around the vehicle. This is described further below in relation to FIG. 7.

Example systems use the front camera in combination with the side camera and history from the forward looking camera to calculate the height of any such obstruction from the ground plane. The ground plane is calculated using an object detection algorithm on data taken from the surround and forward looking cameras. Should the obstruction impair the drivers view, as calculated using known vehicle geometry, the system displays images taken from one or more of the side facing cameras. Cameras are chosen based on the location of the obstruction.

In some embodiments, the processor also monitors the vehicle speed in relation to an exit speed threshold such that when the vehicle speed increases above the exit speed threshold, the processor configures the display to not display the images captured by the camera. This feature enables the system to turn off the display or configure the display to not display the captured images after the driver has exited the junction or the like. In an example embodiment, the exit speed threshold is set to 10 mph. However, other speeds in the range 5 to 15 mph may be used. It should be noted that the approach speed threshold and the exit speed threshold may have the same value, for example 5 mph, and be met only when the speed is decreasing in respect of the approach speed threshold, and increasing in respect of the exit speed threshold.

FIG. 3 schematically shows a scenario where the vehicle 1 is parked in a car parking space 40 and positioned between adjacently parked cars 42. As schematically shown, the driver's field of view FOV_d is obstructed to at least the right hand side by one of the parked cars. The camera 12 captures images which are processed by the processor 14 using aforementioned techniques to determine that the parked car is in the camera field of view FOV_c and therefore in the driver's field of view FOV_d and thus an obstruction to the driver's view. On determining the presence of the obstruction, the processor 14 configures the display 16 to display the images captured by the camera 12.

The camera 12 described above is shown and described as positioned at the front of the vehicle 1 and to include in the field of view FOV_c a view perpendicular to the direction of facing of the vehicle 1. In some embodiments of the invention, the camera 12 comprises a field of view including opposing views perpendicular to the direction of facing of the vehicle. The camera field of view FOV_c is thus more than 180 degrees. In an example embodiment, the camera field of view FOV_c is 190 degrees. In some embodiments, a wide angle lens, for example a fish eye lens or similar, is used to provide the wide field of view. In these embodiments, the camera has a field of view that includes a view equivalent to right and left hand view from the direction of facing of the car. Image flattening algorithms can be used to flatten the image obtained from the 180 degree or greater view so as to make the images suitable for reproduction in the vehicle.

The camera 12 may also be positioned at the rear of the vehicle 50 (see FIG. 1) so as to aid the driver when reversing the vehicle. In some embodiments of the invention, the camera system comprises a camera at a forward location of the vehicle and a camera at a rearward location of the vehicle.

The operation of the vehicle camera system is further described with reference to FIG. 4, which schematically shows a flow diagram of the decisions made by an example system according to an embodiment of the invention. As described above, inputs 102, 104 from one or more cameras is used to determine whether the driver's view is occluded at 106. The system then determines at 108 whether the vehicle speed is below a threshold which is indicative of a situation where the system may be used.

At step 110 the example system determines whether the vehicle is in a location where the system should or has previously been deactivated. Accordingly, in some embodiments of the invention, the processor is able to determine the location of the vehicle 1 and configure the display to display or not display captured images accordingly. The processor may determine the location directly using a global positioning system GPS sensor or may use data retrieved from a GPS sensor positioned on the vehicle for other purposes such as satellite navigation, for example. On determining the location of the vehicle 1, the processor compares the determined location to a list of known locations in a lookup table stored in a memory of the processor. Those known locations may be places where the camera system should not display images, such as the garage where the car is stored. Known locations may be entered in the lookup table by the driver 2 through interaction with the processor via the display. Locations entered into the lookup table, as indicating places to display or not display images, can be deleted from the lookup table.

In example embodiments, the processor is able to learn known locations where the system should be deactivated. An override switch is provided on or near to the display 16 so that the driver can selectively deactivate the system. The system stores in its memory the location of the vehicle at the point where the system was deactivated. After the system has been deactivated a predefined number of times in a certain location, the processor adds that location to the lookup table. A margin of error in the location approximately equal to the known error in the GPS sensor is applied to the location in the lookup table so that an inaccurate reading of the location of the vehicle does not lead to the location evading the deactivated location in the table. The number of times the system must be deactivate in order for the location to be added to the lookup table is at least two times. In an example embodiment, the location is added to the lookup table after the system has been deactivated in that location on three occasions.

In another example embodiment, the system may determine that the driver has not deactivated the system in a location where the system has been previously deactivated, but not added to the lookup table, and may as a result subtract from the total number of deactivations in that location. For example, the system may have been deactivated two times when the vehicle was positioned at a particular junction. On the next occasion the vehicle was at the junction, the driver chose not to deactivate the system because, for example, a new obstruction was present. The processor recognises that the driver has not deactivated the system and adjusts the record of the total number of deactivations to one time. In some embodiments, the processor may reset the total number of deactivations on occasion of the driver not deactivating the system.

Returning to FIG. 4, the example system continues to 112 if the vehicle is not in a disabled or deactivated location. At step 112, the system determines the drive mode of the vehicle. Accordingly, in some embodiments of the invention, the processor is arranged to determine the mode of the vehicle. The mode is also known as the driving mode and includes for example, reverse, drive, park, and so on. In an example embodiment, a standard vehicle control unit outputs the drive mode, which is input to the processor. On determining the drive mode, the processor is arranged to proceed beyond step 112. If the processor determines the drive mode is park, the processor does not proceed beyond step 112. This is because park mode is indicative of the driver not wishing to move the car and accordingly, no images are required by the driver.

In an example embodiment, on determining that the vehicle is in drive mode, the processor configures the display to display images obtained from the camera at the front of the vehicle because drive mode is indicative of the driver wishing to move the vehicle forwards. Similarly, on determining that the vehicle is in reverse mode, the processor configures the display to display images obtained from the camera at the rear of the vehicle because reverse mode is indicative of the driver wishing to move the vehicle backwards.

In some embodiments of the present invention, the processor is arranged to determine the direction of movement of the vehicle 114. In an example embodiment, an accelerometer is used to measure the movement of the vehicle and the measurement passed to the processor. The direction of movement of the vehicle is used to determine which camera should be selected 116, 118 by the processor to obtain images for display on the screen at 120. This embodiment is useful, for example, in manual cars where the vehicle might be parked on a slope and the driver's view is occluded. The driver might not necessarily select a mode of operation of the vehicle, for example by selecting gear, and instead might release the brake and allow the vehicle to move out of the parked position by gravitational force alone. Therefore, the accelerometer may be used in conjunction with the mode sensor so that where no mode is selected, the processor remains able to determine the intended movement of the car to analyse and present images accordingly.

Figure 4:
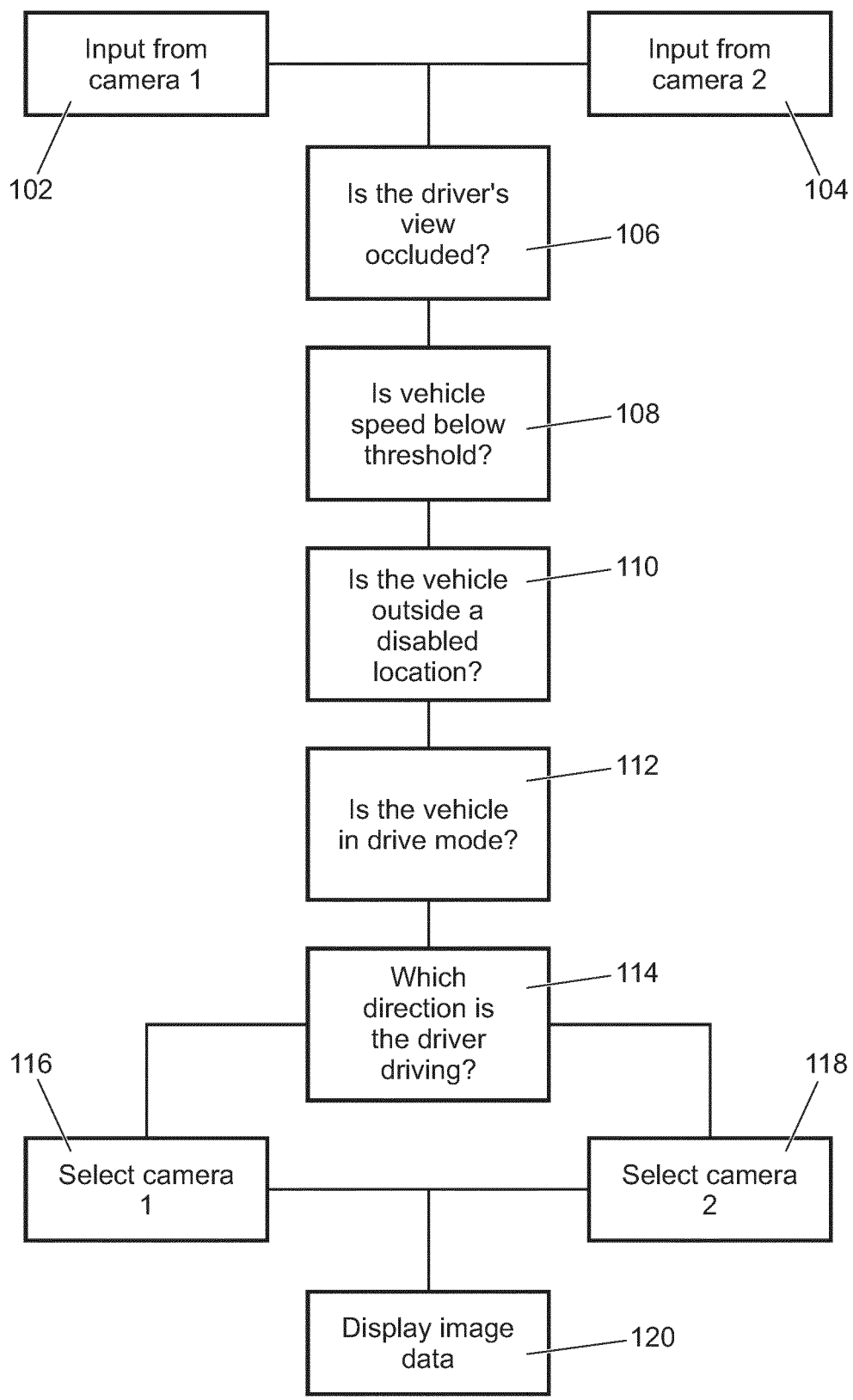
FIG. 4 is a flow-diagram of a method of operation of a vehicle camera system according to an embodiment of the invention.
Figure 5:
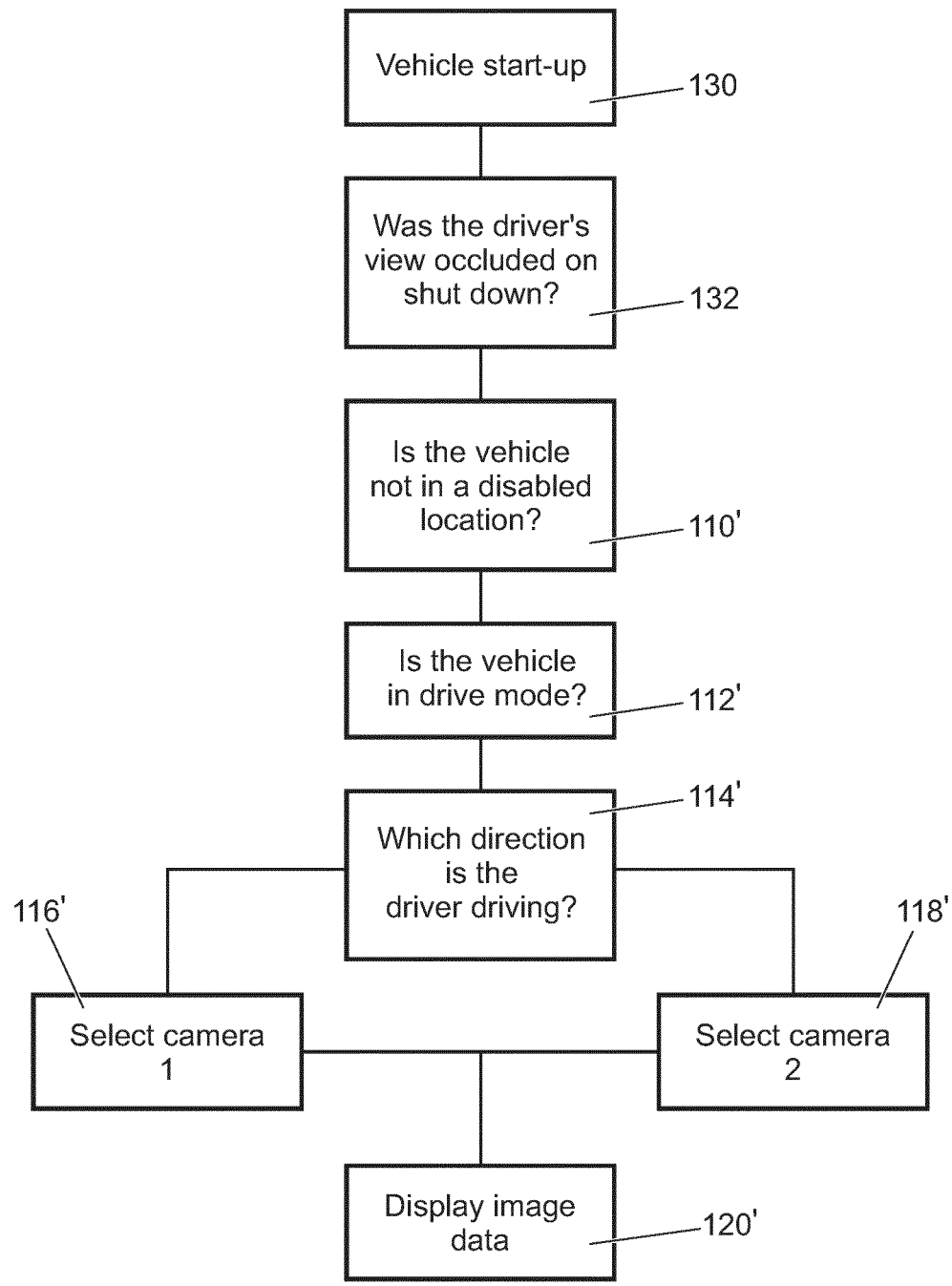
FIG. 5 is a flow-diagram of a method of operation of a vehicle camera system according to an embodiment of the invention.

FIG. 5 illustrates a method of operation of an example vehicle camera system. The processor according to the system of FIG. 5 has a memory so that following vehicle start-up 130, the system can determine from the processor memory whether the driver's view was obstructed on shut down of the vehicle at 132. This is particularly useful in circumstances such as where the vehicle has been driven into a parking location where the driver's view is occluded but on parking, the camera field of view FOV_c is clear and does not contain obstruction. On start-up the processor's memory is accessed to determine if the driver's view is likely to be occluded. Assuming the view is occluded, the system proceeds to steps 110 to 120 as described in relation to FIG. 4.

Some embodiments of the system also comprise a driver-view camera at a position proximal to the driver's view. In an example embodiment, the driver-view camera is mounted at or near to the driver's door, optionally near to the door handle so as to align close to the driver's head. In another example embodiment, the driver-view camera is mounted in the driver's head rest so as to align close to the driver's head. In another example embodiment the driver-view camera is mounted on the side of the vehicle.

The driver-view camera is arranged to capture images of a view perpendicular to the driver's forward facing at a position proximal to the driver's head such that the images obtained by the camera are equivalent to the view observed by the driver when looking out of their side windows. The processor processes the driver-view images to determine the presence of objects in, and therefore obstructions to, the driver's view. On determining the presence of obstructions to the driver's view, the processor continues to determine the driving mode the vehicle is in and therefore the direction of intended driving. The processor then configures the display to display images obtained from the camera relevant to the driver's intention.

Figure 6:
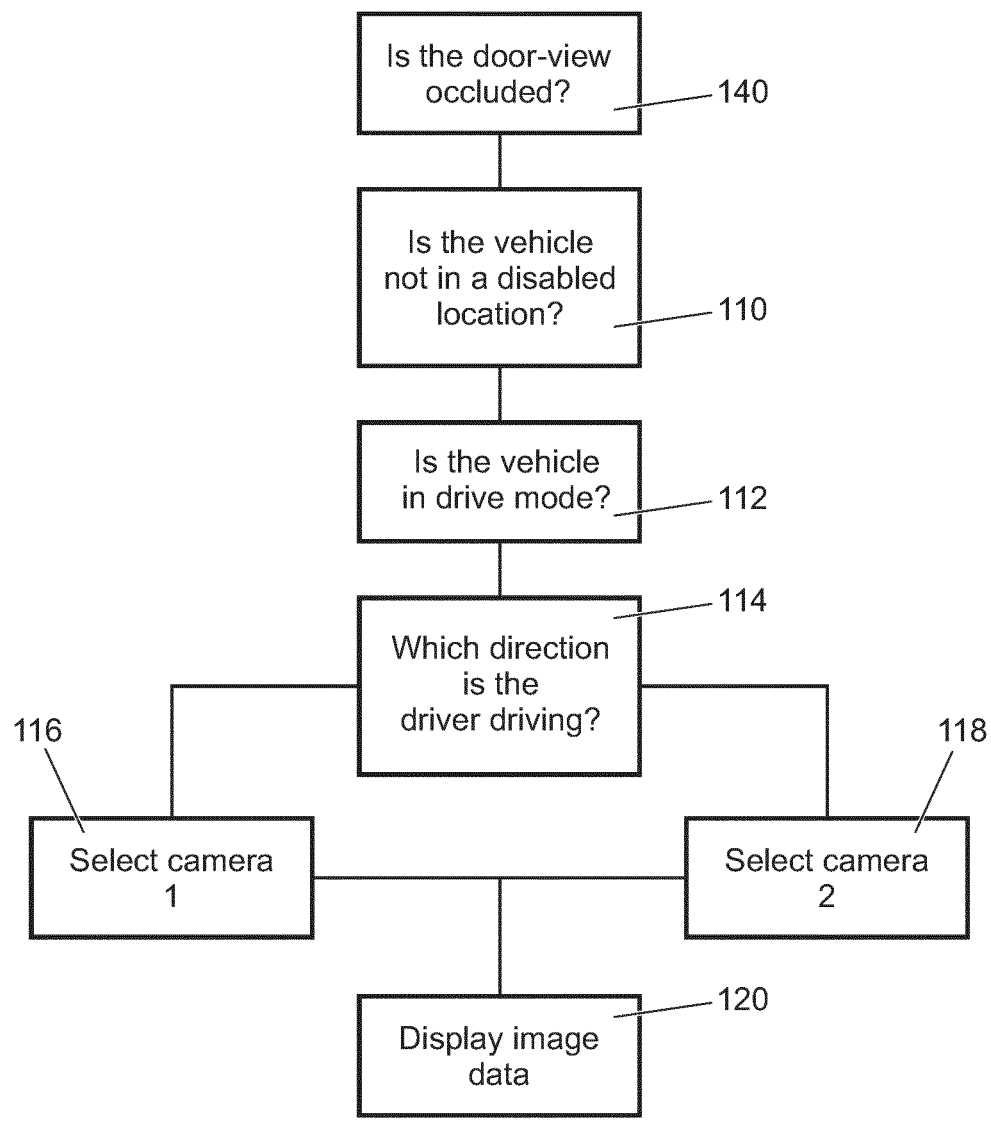
FIG. 6 is a flow-diagram of a method of operation of a vehicle camera system according to an embodiment of the invention.

FIG. 6 shows the method performed by a system featuring a driver-view, or door view, camera. At 140 the system determines whether the driver-view is occluded using the door view camera. If the driver-view camera is occluded then the system proceeds to steps 110 to 120 as described in relation to FIG. 4 or 5.

It should be appreciated that steps 102 to 120 in FIGS. 4 to 6 and steps 130, 132 and 140, can be completed simultaneously or in an order different to the examples shown in FIGS. 4 to 6.

Figure 7:
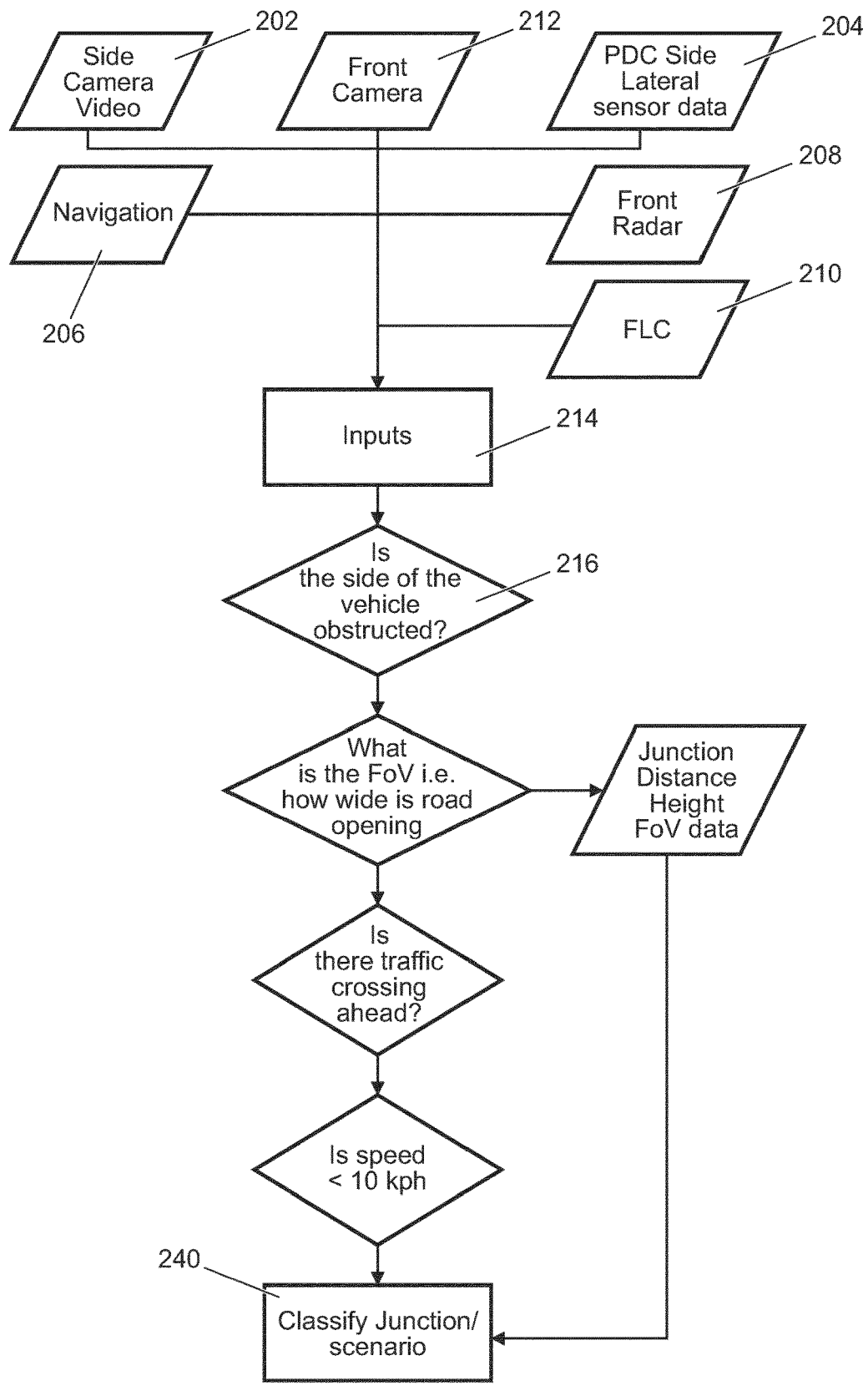
FIG. 7 is a flow-diagram of a method of operation of a vehicle camera system according to an embodiment of the invention.

FIG. 7 shows an example system diagram. Inputs to the processor 214 include a driver-view or side camera video 202, a front or rear camera video 212, side facing ultrasonic sensors 204, a navigation system or GPS sensor 206, radar sensors, and a forward looking camera sensor 210. The processor uses the inputs to determine, at 216, whether the side of the vehicle is obstructed, and classify the junction/scenario at 240.

In example embodiments the system uses the inputs from the ultrasonic sensors 204, navigation or GPS sensors 206, radar or pdc sensors, or other proximity sensors to augment information provided by the camera system. In an example, a confidence metric is used to confirm obstructions. In this each positive detection of an obstruction increases the confidence in the detection. It follows that each negative detection decreases the confidence. A confidence threshold may be employed to minimise false positive overall system obstruction detection.

In an example embodiment a confidence threshold of 80% is required to confirm the presence of an obstruction. Object detection algorithms using camera inputs may, for example, provide a confidence score of 75% associated with each positive detection. Other sensors may have a lower associated confidence score of, for example, 20%. Thus in embodiments a combination of a positive camera object detection and a positive ultrasonic sensor object detection may give a confidence score of 95% and overcome the threshold to positively identify an object.

In another example embodiment, an obstruction is detected by the camera, ultrasonic sensor and pdc sensor while the radar sensor finds no obstruction. Assuming the exemplary confidence scores given above the overall confidence score is again 95%. In another example, an obstruction is detected by the camera and ultrasonic sensor while the pdc sensor and radar sensor find no obstruction. In this example the overall confidence score is 55% so the threshold confidence value is not met. Other confidence scores and thresholds may be employed.

In example embodiments, the vehicle camera system is located on or in an on road vehicle. In other example embodiments, the vehicle camera system is located on or in an off road vehicle.

The invention claimed is:

1. A processor for a vehicle camera system having one or more cameras, the processor configured to:
receive image data captured by a camera of the camera system, the image data providing a camera field of view surrounding a host vehicle, wherein the camera field of view is from, a first position local to the host vehicle and comprises a view perpendicular to a facing direction of the host vehicle;
determine a presence of an obstruction using camera system image data captured by the camera of the camera system;
determine whether a condition is satisfied, wherein satisfaction of the condition requires a determination that the obstruction obstructs a portion of a field of view of a driver of the host vehicle, wherein the driver field of view is from a second position local to the host vehicle, different from the first position, and the obstructed portion of the field of view of the driver is to a side of the host vehicle and is visible from the camera image data; and
control a display to display the image data comprising the obstructed portion of the field of view of the driver to at least the driver in dependence on determining that the condition is satisfied, wherein the processor is configured to not display the image data when the condition is not satisfied,
wherein the processor determines the presence of the obstruction using an object detection algorithm that compares the camera system image data with a known reference having a reference field of view that comprises an empty space of a predefined depth and the determination of the presence of the obstruction is made in dependence on differences found in the comparison.

2. The processor of claim 1, further configured to;
determine a speed of movement of the host vehicle; and
control the display to display the image data when the speed of the host vehicle is below a predetermined threshold.

3. The processor of claim 1, farther configured to:
determine a speed of movement of the host vehicle; and
prevent the display of the image data when the speed of the host vehicle is above a predetermined threshold.

4. The processor of claim 1, further configured to:
determine a location of the host vehicle; and
control the display to display the image data when the host vehicle is at a predetermined location or prevent the display of the image data when the host vehicle is at a predetermined location.

5. The processor of claim 1, further configured to:
determine a mode of the host vehicle; and
control the display to display the image data in dependence on the mode of the host vehicle.

6. A vehicle camera system comprising:
one or more cameras, including a first camera configured to capture image data surrounding a host vehicle, the image data providing a camera field of view surrounding a host vehicle, wherein the camera field of view is from a first position local to the host vehicle and comprises a view perpendicular to a facing direction of the host vehicle;
a display configured to display the image data; and
a processor arranged to:
determine a presence of an obstruction using camera system image data captured by the camera of the camera system;
determine whether a condition is satisfied, wherein satisfaction of the condition requires a determination that the obstruction obstructs a portion of a field of view of a driver of the host vehicle, wherein the driver field of view is from a second position local to the host vehicle, different from the first position, and the obstructed portion of the field of view of the driver is to a side of the host vehicle and is visible from the camera image data; and control the display to display the image data comprising the obstructed portion of the field of view of the driver to at least the driver in dependence on determining that the condition is satisfied, wherein the processor is configured to not display the image data when the condition is not satisfied, wherein the processor determines the presence of the obstruction using an object detection algorithm that compares the camera system image data with a known reference having a reference field of view that comprises an empty space of a predefined depth and the determination of the presence of the obstruction is made in dependence on differences found in the comparison.

7. The vehicle camera system of claim 6, wherein the first camera is positionable at a front of the host vehicle and wherein the captured image data comprises a view perpendicular to a forward facing view of the host vehicle.

8. The vehicle camera system of claim 6, wherein the first camera is positionable at a rear of the host vehicle, and wherein the captured image data comprises a view perpendicular to a rearward facing view of the host vehicle.

9. The vehicle camera system of claim 6, the one or more cameras further comprising a farther camera configured to capture further image data from a further field of view surrounding the host vehicle, wherein the display is configured to display the further image data and wherein the processor is further configured to:

determine a presence of a second obstruction in the further field of view;

control the display to display the further image data in dependence on determining the presence of the second obstruction in the further field of view, determine a direction heading of the host vehicle; and control the display to display one of the image data or the further image data in dependence on the direction heading.

10. The vehicle camera system of claim 9, wherein the further camera is positionable at a rear of the host vehicle and wherein the captured image data comprises a view perpendicular to a rearward facing view of the host vehicle.

11. The vehicle camera system of claim 6, wherein the camera comprises a wide angle lens, and wherein the camera field of view is equal to or greater than 180°.

12. The vehicle camera, system of claim 6, further comprising an override switch operable to control the display to display or not display the image data.

13. The vehicle camera system of claim 6, further comprising one or more sensors, and wherein the processor is configured to:

determine a presence of an obstruction in a field of view of the one or more sensors, wherein each determined presence carries an associated confidence score and wherein each confidence score contributes to a confidence total, wherein the processor is configured to control the display to display the image data in dependence on a comparison of the confidence total with a confidence threshold.

14. A method for selectively displaying information to a driver of a host vehicle, the method comprising:

receiving image data captured by a camera of a vehicle camera system having one or more cameras, the image data providing a camera field of view surrounding the host vehicle, wherein the camera field of view is from a first position local to the host vehicle and comprises a view perpendicular to a facing direction of the host vehicle;

determining a presence of an obstruction using camera system image data captured by the camera of the vehicle camera system, and using an object detection algorithm wherein the camera system image data is compared with a known reference having a reference field of view that comprises an empty space of a predefined depth, and wherein determining the presence of the obstruction is made in dependence on differences found in the comparison;

determining whether a condition is satisfied, wherein satisfaction of the condition requires a determination that the obstruction obstructs a portion of a field of view of the driver of the host vehicle, wherein the driver field of view is from a second position local to the host vehicle, different from the first position, and the obstructed portion of the field of view of the driver is to a side of the host vehicle and is visible from the camera image data; and displaying the image data comprising the obstructed portion of the field of view of the driver to at least the driver in dependence on determining that the condition is satisfied, wherein the image data is not displayed when the condition is not satisfied.

15. The method of claim 14, further comprising:

determining a speed of movement of the host vehicle; and controlling a display to display the image data when the speed of the host vehicle is below a predetermined threshold and/or preventing the display of image data when the speed of the host vehicle is above the predetermined threshold.

16. The method of claim 14, further comprising:

determining a location of the host vehicle; and controlling a display to display the image data when the host vehicle is at a predetermined location or preventing the display of the image data when the host vehicle is at the predetermined location.

17. The method of claim 14, further comprising:

determining a mode of the host vehicle; and controlling a display to display the image data in dependence on the mode of the host vehicle.

* * * * *